United States Patent [19]

Iida et al.

[11] 4,139,865
[45] Feb. 13, 1979

[54] TELEVISION RECEIVER WITH VIDEO CHANGEOVER SWITCH RESPONSIVE TO CHANNEL SELECTOR

[75] Inventors: Mikio Iida, Tokyo; Mitsuru Hosoya, Fujisawa, both of Japan

[73] Assignee: Sony Corporation, Tokyo, Japan

[21] Appl. No.: 804,761

[22] Filed: Jun. 8, 1977

[30] Foreign Application Priority Data

Jun. 11, 1976 [JP] Japan .................................. 51-68958

[51] Int. Cl.$^2$ ............................................. H04N 5/44
[52] U.S. Cl. ........................... 358/188; 179/100.11; 358/191; 360/33
[58] Field of Search ............... 358/188, 191; 360/33; 179/100.11

[56] References Cited

U.S. PATENT DOCUMENTS

| 3,886,307 | 5/1975 | Evans et al. ...................... | 358/191 X |
| 4,031,548 | 9/1975 | Kato et al. ................... | 179/100.11 X |

Primary Examiner—Robert L. Richardson
Attorney, Agent, or Firm—Lewis H. Eslinger; Alvin Sinderbrand

[57] ABSTRACT

A televison reciver for reproducing a picture selectively derived from a television signal or from an external video signal, including a television tuner having a variable reactance device as a tuning element, a video detector coupled to said television tuner and producing a television video signal at a television video signal output terminal, thereof a channel selector having a plurality of channel selecting switches for supplying a tuning voltage corresponding to a selected channel to the variable reactance device of said television tuner, an external video signal input terminal, a gate circuit operative to select a video signal either from said television video signal input terminal or from said external video signal input terminal, flip-flop circuit having first and second states for controlling said gate circuit, a switch for setting said flip-flop circuit to control the gate circuit to select an external video signal, and a reset circuit connected to said channel selecting switches for resetting said flip-flop circuit to control the gate circuit to select a television video signal.

6 Claims, 3 Drawing Figures

TELEVISION RECEIVER WITH VIDEO CHANGEOVER SWITCH RESPONSIVE TO CHANNEL SELECTOR

BACKGROUND OF THE INVENTION

1. Field of the Invention

The present invention relates generally to a television receiver and is directed more particularly to a television receiver which has a change-over device for selecting either a broadcast television signal or an external video signal, such as from a VTR (video tape recorder), a television camera, or the like and to supply the selected signal to the CRT (cathode ray tube) of the televison receiver.

2. Description of the Prior Art

In the art there has been proposed a TV (television) receiver which is provided with an external video input terminal, in addition to the usual broadcast input terminal, and a slide change-over switch. The slide switch is operative to be changed over to select either a broadcast TV signal or an external video signal, such as from a VTR, a TV camera and the like and supply the selected signal to the CRT of the TV receiver to reproduce a picture therefrom.

In one type of prior art TV receiver, channel selector push-buttons for selecting TV channels are located apart from a mode change-over which selects either a TV receiving mode or a VTR reproducing mode. Furthermore, the manner of operation of the push-buttons and change-over switch differ, which can have a deleterious operational property. By way of example, if the mode change-over switch is in the VTR mode, then even if a channel selecting push-button is operated, no TV picture corresponding to the selected channel is reproduced unless the mode change-over switch is changed over back to the broadcast TV mode. As a result thereof, that a user may believe that the TV receiver is out of order.

Further, if a VTR is connected to the TV receiver, then in order to change from a VTR reproducing mode to a TV signal receiving mode with the selection of a desired channel, the slide change-over switch must be changed over to the broadcast TV signal receiving mode and thereafter a desired channel button is operated, which is rather troublesome.

OBJECTS AND SUMMARY OF THE INVENTION

An object of the present invention is to provide a novel television receiver free from the defects and disadvantages inherent in the prior art.

Another object of the invention is to provide a television receiver in which channel selection and mode change can be carried out in a similar manner and the television receiver can be changed from a VTR reproducing mode to a TV signal receiving mode with the selection of a desired channel, all in one operation.

According to an aspect of the present invention there is provided a television receiver for reproducing a picture selectively derived either from a television signal or from an external video signal, comprising a television tuner having a variable reactance device, such as a voltage-controlled reactance, as a tuning element, a video detector coupled to the television tuner for producing a television video signal at a television video signal output terminal, a channel selector having a plurality of channel selecting switches for supplying a tuning voltage corresponding to a selected channel to the variable reactance device of said television tuner, an external video signal input terminal, a gate circuit controllable to select either the video signal at the television video signal input terminal or the video signal at the external video signal input terminal, a flip-flop circuit having first and second states for controlling said gate circuit, a switch for setting said flip-flop circuit to control the gate circuit to select the external video signal, and a reset circuit connected to said channel selecting switches for resetting said flip-flop circuit to control the gate circuit to select the television video signal.

Other objects, features and advantages of the present invention will become apparent from the following description taken in conjunction with the accompanying drawings.

DESCRIPTION OF THE PREFERRED EMBODIMENTS

With reference to the drawings, the present invention will be hereinafter described.

Figure 1:
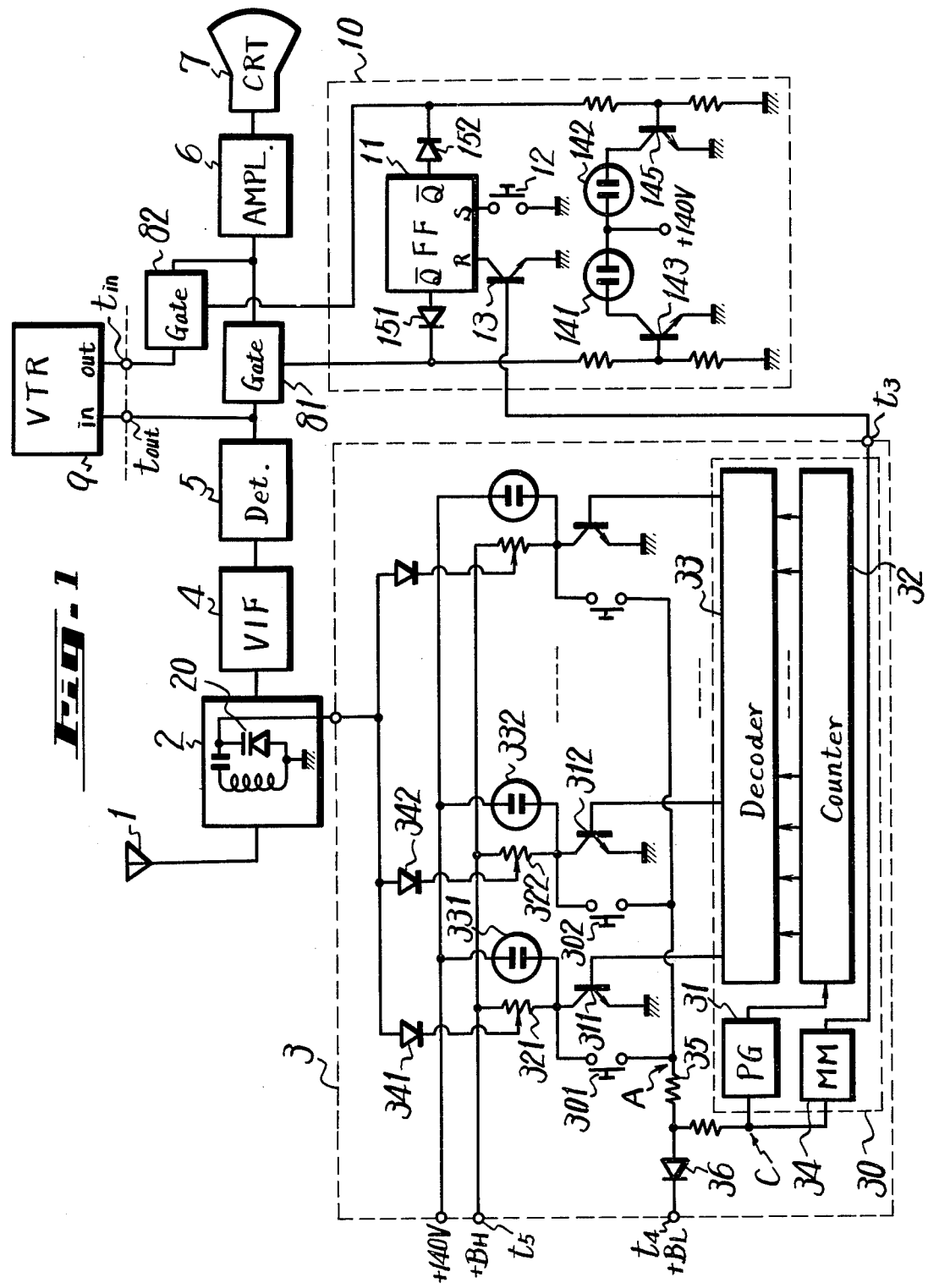
FIG. 1 is a circuit diagram showing an example of the television receiver according to the invention.

FIG. 1 is a circuit diagram of an example of the television receiver according to the invention. In FIG. 1, 1 designates an antenna, 2 a tuner, 4 an intermediate frequency amplifier, 5 a video detector, 6 a video amplifier, and 7 a CRT (cathode ray tube), respectively. These devices are known to the prior art, so that their detailed description will be omitted.

In this example, the tuner 2 is a voltage controlled type and includes a variable reactance element (for example, a variable capacitance diode) 20. Thus, if the voltage applied across the reactance element 20 is varied, the tuning condition of tuner 2 is varied, and a desired channel can be selected. To this end, a channel selector 3 is provided to apply a voltage corresponding to a selected or desired channel to the reactance element 20. The channel selector 3 is formed of push button switches 301, 302, . . . for channel selection, switching transistors 311, 312, . . . , variable resistors 321, 322, . . . for presetting respective channel selection voltages, neon lamps 331, 332, . . . for displaying selected channels, diodes 341, 342, . . . and a block 30 for channel selection. The channel selection block 30 turns transistors 311, 312, . . . ON one by one and sequentially during the time period when a predetermined voltage (for example, $+B_L$ voltage) is applied to point C. Channel selection block 30 is formed of a pulse generator 31, a counter circuit 32, and a decoder circuit 33. This channel selection block 30 alternatively can be formed of a pulse generator and a ring counter.

Figure 2:
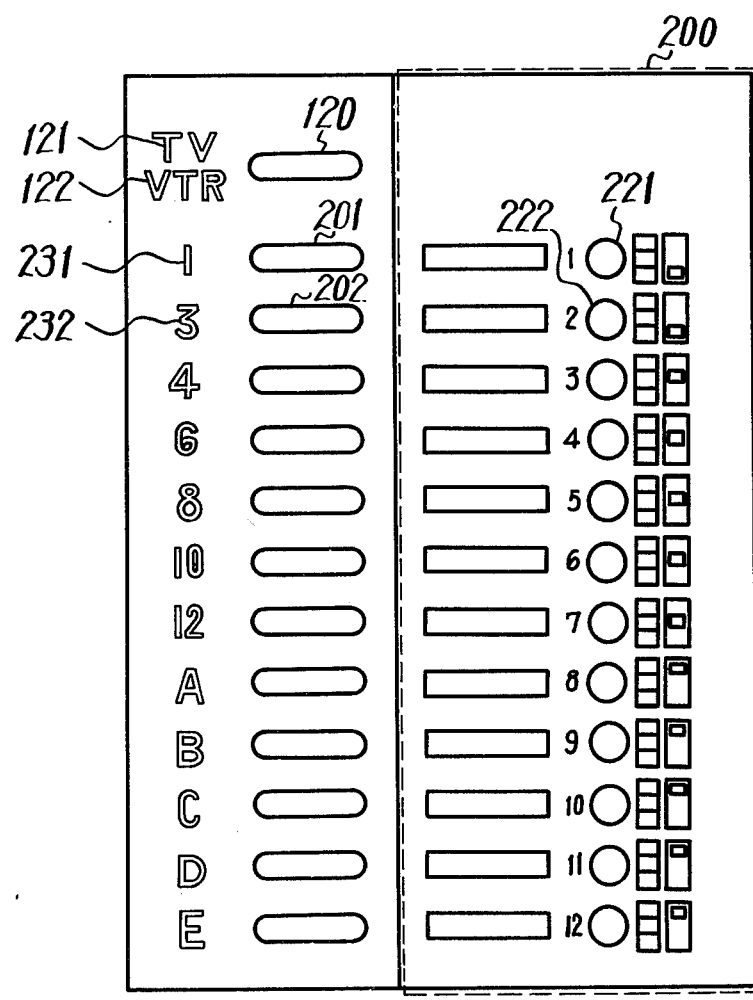
FIG. 2 is a front view showing the operation part of the television receiver which can be used in FIG. 1.

FIG. 2 shows an example of the portion of the TV receiver which is operated by the user. In FIG. 2, 201, 202, . . . indicate channel selector push-buttons for channel selection which are, for example, self-return type push-buttons and correspond to switches 301, 302, . . . shown in FIG. 1, respectively. Thus, only during the time period that a desired selector push-button is pushed down, or depressed, will the corresponding switch 301, 302, . . . be turned ON, and when the push-button is released, the corresponding switch returns to its OFF-state. As an alternative, selector buttons 201, 202, ... may be touch switches. Disposed to one side of buttons 201, 202, ... there are provided channel displays 231, 232, ... respectively, behind which are located neon lamps 331, 332, ... shown in FIG. 1 to illuminate selected channels. Since selector buttons 201, 202, ..., a power switch (not shown in FIG. 2), a volume control (not shown) and other controls are used frequently, they are provided to an exposed panel of the front portion of the TV receiver cabinet. Other channels which are not used so frequently are covered by a lid or are located at the side or back panel of the TV receiver cabinet so as to avoid erroneous operation thereof and improve the appearance defined by the TV receiver. In the example shown in FIG. 2, the portion of a dotted line block 200 is covered by a lid. At the portion 200 there are located preset knobs 221, 222, ... corresponding to the variable resistors 321, 322, ..., and other controls.

Turning back to FIG. 1, the channel selector 3 supplies a pulse output (which is used as an AFT defeat or sound mute), to a mode changing circuit 10, which will be described later, through a terminal $t_3$ when a switch 301, 302 ... is turned ON.

The TV signal from video detector 5 is fed to an external output terminal $t_{out}$ and to an input terminal of a gate circuit 81. The external output terminal $t_{out}$ is connected to the input terminal of VTR 9. An output terminal from the VTR, from which a reproduced output is derived is fed through an external input terminal $t_{in}$ of the TV receiver to an input terminal of a gate circuit 82. The output terminals of gate circuits 81 and 82 are connected through the video amplifier 6 to the video signal input terminal of CRT 7. Only one of gate circuits 81 and 82 is made conductive by the output signal from mode changing circuit 10 to selectively supply the TV signal (i.e., the received broadcast signal) or reproduced the signal reproduced by VTR to the CRT 7.

The mode changing circuit 10 includes a flip-flop circuit 11 which supplies its two outputs $\overline{Q}$ and Q through diodes 151 and 152 to the control terminals of gate circuits 81 and 82, respectively. As an example, the flip-flop circuit 11 is an RS flip-flop which is reset without failure when first is supplied thereto.

As shown in FIG. 2, the user's operating control portion of the TV receiver further includes a mode changing push-button 120, which is located near the channel selection operation button 201 and is the same as the push-buttons 201, 202, ... in its operational manner. A TV mode display 121 and a VTR mode display 122 are adjacent mode changing push-button 120, and behind the displays 121 and 122 there located neon lamps 141 and 142 shown in FIG. 1, respectively.

The operation of the TV receiver of the invention will be now described. When the flip-flop circuit 11 is in its reset state, the gate circuit 81 is conductive and a desired channel may be selected. Let it be assumed that the first channel is selected, so that only the first transistor 311 of channel selector 3 is turned ON while all of the other transistors 312, are turned OFF. At this time, only the output voltage of the varible resistor 321 is at its predetermined preset value which is lower than $+B_H$ output voltage of the other variable resistors 322, ... . Accordingly, only the diode 341 is conductive and the other diodes 342, ... are non-conductive. As a result, the predetermined preset voltage from the variable resistor 321 is applied through diode 341 to the reactance element 20 of tuner 2. At this time, only the neon lamp 331 is lit and the other neon lamps 332, ... are not lit. Further, since the flip-flop circuit 11 is in its reset state transistor 143 is turned ON and, the neon lamp 141 is lit to illuminate the TV display 121.

Under these conditions, if the push-button 120 is pushed down to turn the switch 12 of mode changing circuit 10 ON, the flip-flop circuit 11 is set and a relatively high level output therefrom is fed through the diode 152 to the control terminal of gate circuit 82. As a result, gate circuit 82 is made conductive and hence the reproduced signal from the VTR 9 is supplied through the gate circuit 82 and video amplifier 6 to the CRT 7. At this time, transistor 145, whose base is connected to diode 152, is turned ON, so that the neon lamp 142 is lit to illuminate the VTR display 122.

Next, let it be assumed that the switch associated with another desired channel, such as the switch 302 of the second channel, is turned ON. Since the transistor 312 initially is OFF, $+B_H$ voltage is applied through the variable resistor 322 and switch 302 to point A. The point A is connected through a resistor 35 and a diode 36 to $+B_L$ voltage source ($+B_L < +B_H$), so that about $+B_L$ voltage is applied to point C. This actuates the pulse generator 31 to supply pulses to counter 32 whose count is decoded by decoder 33, thereby turning the switching transistors 311, 312, ... ON sequentially and one by one. In this case, the transition time period during which each transistor is turned ON is selected about 0.7 ms which is sufficiently shorter than the time period that the push-button 202 is manually pushed down and the switch 302 is made ON. Therefore, during the time period that push-button switch 202 is operated, all the transistors 311, 312, ... can be turned On at least one time. As set forth just above, during the time period that the switch 302 is turned ON, the transistors 311, 312, ... are turned On sequentially; and when the transistor 312, which is connected in parallel to switch 302 becomes ON, the voltage at point A becomes zero and hence the voltage at point C also becomes zero. Accordingly, the pulse generator 31 stops its operation with the result that transistor 312 held in ON and hence the second channel is selected.

When switch 302 is turned ON, a monostable-multivibrator 34 in the block 30 produces one pulse in response to $+B_L$ voltage applied to point C. This pulse from the monostable-multivibrator 34 is fed through terminal $t_3$ to the base of transistor 13 in the mode changing circuit 10. Thereby, the flip-flop circuit 11 is reset, so that a relatively high level output from the flip-flop circuit 11 is supplied through diode 151 to the control terminal of gate circuit 81. As a result, the gate circuit 81 is made conductive to supply therethrough and through video amplifier 6 to the TV signal from video detector 5 to the CRT 7. At this time, transistor 143, whose base is connected to the diode 151, is turned ON and the neon lamp 141 is lit to illuminate the TV display 121. At the same time, the Q output of flip-flop circuit 11 is relatively low to make the gate circuit 82 non-conductive and to turn OFF transistor 145 to extinguish the neon lamp 142.

With the present invention, it is possible by merely operating a channel selection button to change over to a desired channel in the TV receiving mode from the VTR reproducing mode without the requirement of also operating an additional changing switch.

In the above channel selector 3, if a particular channel had been selected and then push-button 120 is operated to change over to a VTR reproducing mode, and then it is desired to return to the selected broadcast channel, flip-flop circuit 11 might not be reset. For example, let it be assumed that push-button 201 had been operated, and then push-button 120 is operated, and now the operator selects push-button 201 once again. Since the transistor 311 is already ON, no $+B_L$ voltage is applied to point C, when switch 301 is closed, and hence no pulse output is delivered to the terminal $t_3$. To avoid such a defect, another channel selector is used.

Figure 3:
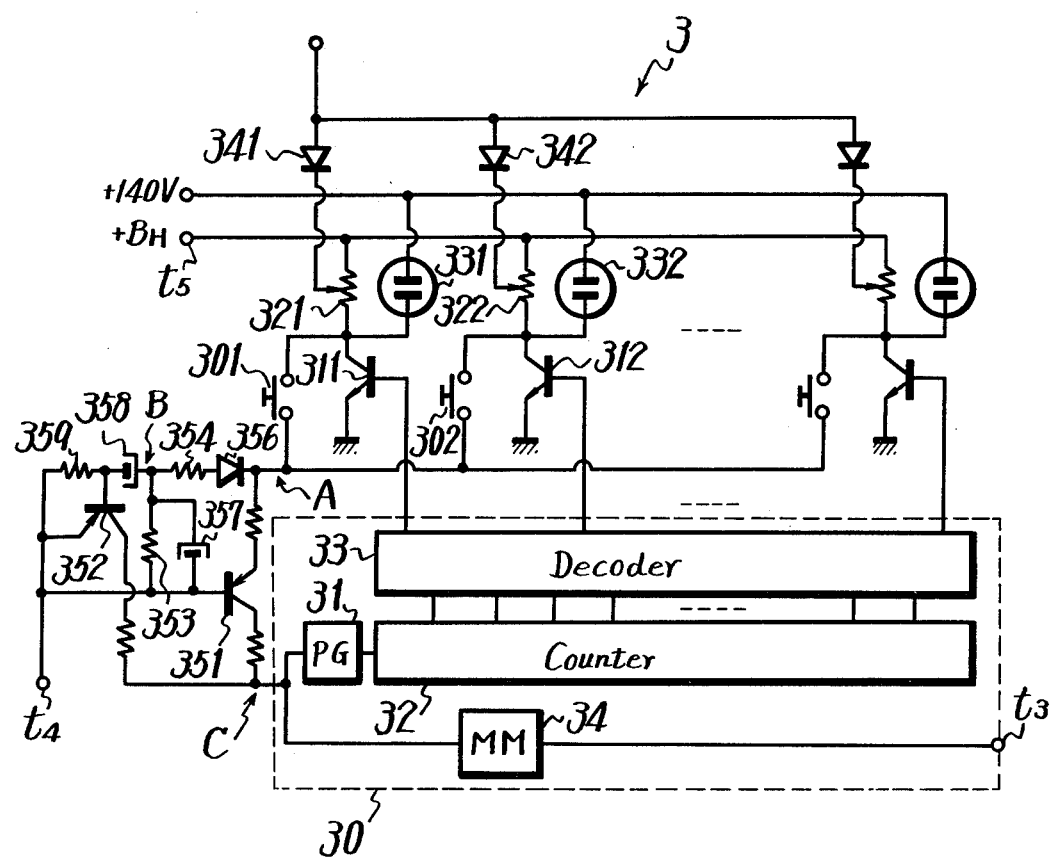
FIG. 3 is a circuit diagram showing another example of the channel selector which can be used in the invention.

FIG. 3 is a connection diagram showing an example of another channel selector for use with the invention, in which the same elements as those of FIG. 1 are identified with the same numerals and their description will be omitted.

When a desired channel, for example, the channel associated with switch 301 is selected, only the transistor 311 is turned ON and the predetermined preset voltage from variable resistor 321 is applied through diode 341 to the variable reactance element 20 of tuner 2 (not shown in FIG. 3) similar to the above example. In the example of FIG. 3, at this time, $+B_L$ voltage at a power supply terminal $t_4$ is applied through resistors 353, 354 and a diode 356 to point A. The current flowing through resistors 353, 354 and diode 356 is zero when switch 301 is released to be turned OFF, so that the base-emitter voltage of a transistor 351 is zero and hence transistor 351 is OFF. Also, the voltage at point B is $+B_L$ voltage and accordingly the base-emitter voltage of transistor 352 is zero, so that transistor 352 is also OFF. As a result, the voltage at point C (output terminal) is a predetermined low voltage (for example, zero).

Now, if a push-button associated with another desired channel, for exaple, push-button 202, is pushed down to turn switch 302 ON, $+B_H$ voltage at power supply terminal $t_5$ is applied through variable resistor 322 and switch 302 to point A. Since $+B_H$ voltage is selected higher than $+B_L$ voltage ($+B_H > +B_L$), the transistor 351 is biased forwardly and hence turns ON. Thus, $+B$ voltage appears at the collector of transistor 351 and is applied to point O, so that monostable-multivibrator 34 is driven to produce a pulse which is delivered to terminal $t_3$. In this case, the operation of the remaining aforedescribed elements shown in FIG. 3 is substantially the same as that shown in FIG. 1, so that description thereof will be omitted.

In the example of FIG. 3, if switch 301 had been closed, and then the VTR repreducing mode is selected, and now switch 301 is turned ON once again, since transistor 311 still is ON, the point A now is grounded through swtich 301 and transistor 311 and hence the voltage at point A is changed from $+B_L$ voltage when switch 301 is off to zero when this switch is turned ON Accordingly, the current flows through resistors 353 and 354 and the diode 356 from power supply terminal $t_4$ so that a capacitor 357 is charged up. The voltage at point B is derived by dividing $+B_L$ voltage with resistors 353 and 354. Thus, current flows from the terminal $t_4$ through a parallel circuit formed of the emitter-base of transistor 352 and resistor 359, and through a capacitor 358. Accordingly, the transistor 352 turns ON and a voltage of substantially $+B_L$ appears at its collector. This voltage at the collector of transistor 352 is applied through point C to the monostable-multivibrator 34, so that the latter produces a pulse. The operation of the remaining elements is substantially the same as that of FIG. 1, so that further description thereof will be omitted.

With the example of FIG. 3, noise such as chattering and the like produced by the ON and OFF operation of switches 301, 302, . . . is removed by the integration circuit consisting of resistor 354 and capacitor 357. Hence, a substantially noise-free signal is then fed through the capacitor 358 to the base of transistor 352 as a differentiated signal. Further, since the base of transistor 351 and the emitter of transistor 352 are connected to the $+B_L$ voltage source, then during the reception of the TV signal from a predetermined selected channel these transistors are stable even for a fluctuation of power source voltage which may be caused by high voltage load variation of the video signal system, such as the turner. The resistor 353 serves to determine the discharging time constant of capacitor 357 and its resistance value is selected as a consideration for removing chattering. The voltage charged backwardly in the parallel circuit of resistor 353 and capacitor 357 achieves the discharge of capacitor 358 through resistor 359.

As may be apparent from the above explanation, with the invention selection of the VTR reproduction or TV signal reception of a desired channel can be carried out by operating one button (e.g. push-button 120 or push-button 201, 202 . . .) in the same operation manner, so that the operational property of the system can be improved and erroneous operation can be avoided.

In the above example of the invention, flip-flop circuit 11 is supplied with the trigger signal from switch 12, but it is possible to supply the trigger signal to flip-flow circuit 11 from a remote location (remote control operation member or the like).

It will be apparent that many modifications and variations could be effected by one skilled in the art without departing from the spirit or scope of the novel concepts of the present invention.

We claim as our invention:

1. A television receiver for reproducing a picture selectively derived from a television signal or from an external video signal, comprising:
   a. a television tuner having a variable reactance device as a tuning element;
   b. a video detector coupled to said television tuner and provided with a video signal output terminal for producing a television video signal at said video signal output terminal;
   c. channel selecting means havng a plurality of channel selecting switches operative to supply a voltage corresponding to a selected channel to said variable reactance device of said television tuner;
   d. an external video signal input terminal adapted to be provided with a video signal;
   e. gate means coupled to said video signal input terminal and to said external video signal input terminal for selecting a video signal therefrom to be reproduced as a picture;
   f. a flip-flop circuit having first and second states for controlling said gate means;
   g. a switch for setting said flip-flop circuit to a state whereby said gate means selects the video signal provided at said external video signal input terminal; and
   h. reset means connected to said channel selecting switches for resetting said flip-flop circuit to a state whereby said gate means selects the video signal provided at said video signal output terminal.

2. The television receiver of claim 1 further comprising channel display means responsive to the operation of a channel selecting switch to display an indication of the channel selected thereby; and television/external display means responsive to the state of said flip-flop circuit to display an indication of whether the reproduced picture is derived from said video signal output terminal or from said external video signal input terminal.

3. The television receiver of claim 1 wherein said channel selecting means comprises a source of voltage; a plurality of resistance means for coupling respective ones of said channel selecting switches to said source of voltage; a plurality of transistor means, each coupled to a respective resistance means for causing said respective resistance means to apply a corresponding channel selecting voltage to said variable reactance means when energized; and means for energizing the transistor means coupled to the one resistance means associated with the channel selecting switch which is operated.

4. The television receiver of claim 3 wherein said channel selecting means further comprises pulse generating means actuated when a channel selecting switch is operated to generate successive pulse and de-actuated when the transistor means associated with the operated channel selecting switch is energized; counting means for counting said pulses; and decoding means for decoding the count of said counting means to energize a corresponding transistor means, whereby the count of said counting means continues to change in response to said pulses until said count corresponds to the transistor means associated with said operated channel selecting switch.

5. The television receiver of claim 4 wherein said reset means is operated when said pulse generating means is actuated.

6. The television receiver of claim 4 wherein said reset means comprises a first transistor biased to provide a reset voltage when any one of said channel selecting switches is operated, provided the transistor means associated therewith is not energized; and second transisotr means biased to provide a reset voltage when the channel selecting switch associated with the energized transistor means is operated.

* * * * *